US012715618B2

(12) United States Patent
Pepe et al.

(10) Patent No.: US 12,715,618 B2
(45) Date of Patent: Aug. 25, 2026

(54) SYSTEMS, APPARATUS, AND METHODS FOR MOMENTUM MANAGEMENT FOR A SPACECRAFT

(71) Applicant: The Boeing Company, Arlington, VA (US)

(72) Inventors: Richard Lawrence Pepe, Redondo Beach, CA (US); Sadek Wagdy Mansour, Torrance, CA (US); Haytham Mahmoud Elmasri, Redondo Beach, CA (US)

(73) Assignee: The Boeing Company, Arlington, VA (US)

( * ) Notice: Subject to any disclaimer, the term of this patent is extended or adjusted under 35 U.S.C. 154(b) by 106 days.

(21) Appl. No.: 18/489,443

(22) Filed: Oct. 18, 2023

(65) Prior Publication Data

US 2025/0128832 A1 Apr. 24, 2025

(51) Int. Cl.
*B64G 1/24* (2006.01)
*B64G 1/26* (2006.01)

(52) U.S. Cl.
CPC ............. *B64G 1/242* (2013.01); *B64G 1/262* (2023.08)

(58) Field of Classification Search
CPC .......... B64G 1/242; B64G 1/369; B64G 1/66; B64G 1/10; B64G 1/411; B64G 1/36; B64G 1/283; B64G 1/26; B64G 1/361; B64G 1/262
See application file for complete search history.

(56) References Cited

U.S. PATENT DOCUMENTS

| | | | | |
|---|---|---|---|---|
| 5,850,993 | A | 12/1998 | Hubert | |
| 6,032,904 | A * | 3/2000 | Hosick | B64G 1/411 244/169 |
| 6,053,455 | A * | 4/2000 | Price | B64G 1/26 244/169 |
| 8,868,263 | B2 | 10/2014 | Munir et al. | |
| 9,428,285 | B2 | 8/2016 | Mansour et al. | |
| 10,618,677 | B1 * | 4/2020 | Wu | B64G 1/1021 |
| 10,618,678 | B1 | 4/2020 | Tilley | |
| 10,967,991 | B2 | 4/2021 | Weiss et al. | |
| 2005/0040282 | A1 * | 2/2005 | Wingo | B64G 1/6462 244/10 |
| 2016/0046395 | A1 * | 2/2016 | Mansour | B64G 1/283 701/13 |
| 2016/0167810 | A1 * | 6/2016 | Janu | B64G 1/2229 244/171.2 |
| 2025/0128832 | A1 * | 4/2025 | Pepe | B64G 1/242 |

* cited by examiner

*Primary Examiner* — Hussein Elchanti
(74) *Attorney, Agent, or Firm* — Hanley, Flight & Zimmerman, LLC

(57) ABSTRACT

Systems, apparatus, and method for momentum management for a spacecraft are disclosed. An example spacecraft includes a body; an appendage moveably coupled to the body; a thruster carried by the body; machine-readable instructions; and processor circuitry to execute the machine-readable instructions to detect a change in angular momentum at the spacecraft during firing of the thruster; and in response to the detection, cause the appendage to move relative to the body to adjust a center of mass of the spacecraft relative to a net thrust vector associated with the thruster.

20 Claims, 7 Drawing Sheets

SYSTEMS, APPARATUS, AND METHODS FOR MOMENTUM MANAGEMENT FOR A SPACECRAFT

FIELD OF THE DISCLOSURE

This disclosure relates generally to spacecraft and, more particularly, to systems, apparatus, and methods for momentum management for a spacecraft.

BACKGROUND

A spacecraft may perform orbit control and maintenance maneuvers such as station keeping and station change. Performance of the maneuvers can result in the storage of angular momentum at the spacecraft.

SUMMARY

An example spacecraft includes a body; an appendage moveably coupled to the body; a thruster carried by the body; machine-readable instructions; and processor circuitry execute the machine-readable instructions to detect a change in angular momentum at the spacecraft during firing of the thruster; and in response to the detection, cause the appendage to move relative to the body to adjust a center of mass of the spacecraft relative to a net thrust vector associated with the thruster.

An example apparatus includes memory; machine-readable instructions; and processor circuitry to execute the machine-readable instructions to determine a first angular momentum state of a satellite at a first time; determine a second angular momentum state of the satellite at a second time, the second time associated with performance of a thrusting maneuver by the satellite, detect a change between the first angular momentum state and the second angular momentum state of the satellite; and, in response to the detection of the change, cause an appendage of the satellite to move from a first position to a second position relative to a body of the satellite to change a center of mass of the satellite.

An example non-transitory machine-readable storage medium includes instructions to cause programmable circuitry to at least identify, based on (a) sensor data corresponding to outputs of an inertial measurement sensor of a spacecraft and (b) telemetry data associated with a momentum storage device of the spacecraft, a misalignment between a center of mass of the spacecraft and a net thrust vector during firing of a thruster of the spacecraft; and, responsive to the identification, adjust the center of mass of the spacecraft.

BRIEF DESCRIPTION OF THE DRAWINGS

In general, the same reference numbers will be used throughout the drawing(s) and accompanying written description to refer to the same or like parts. The figures are not necessarily to scale.

Figure 1:
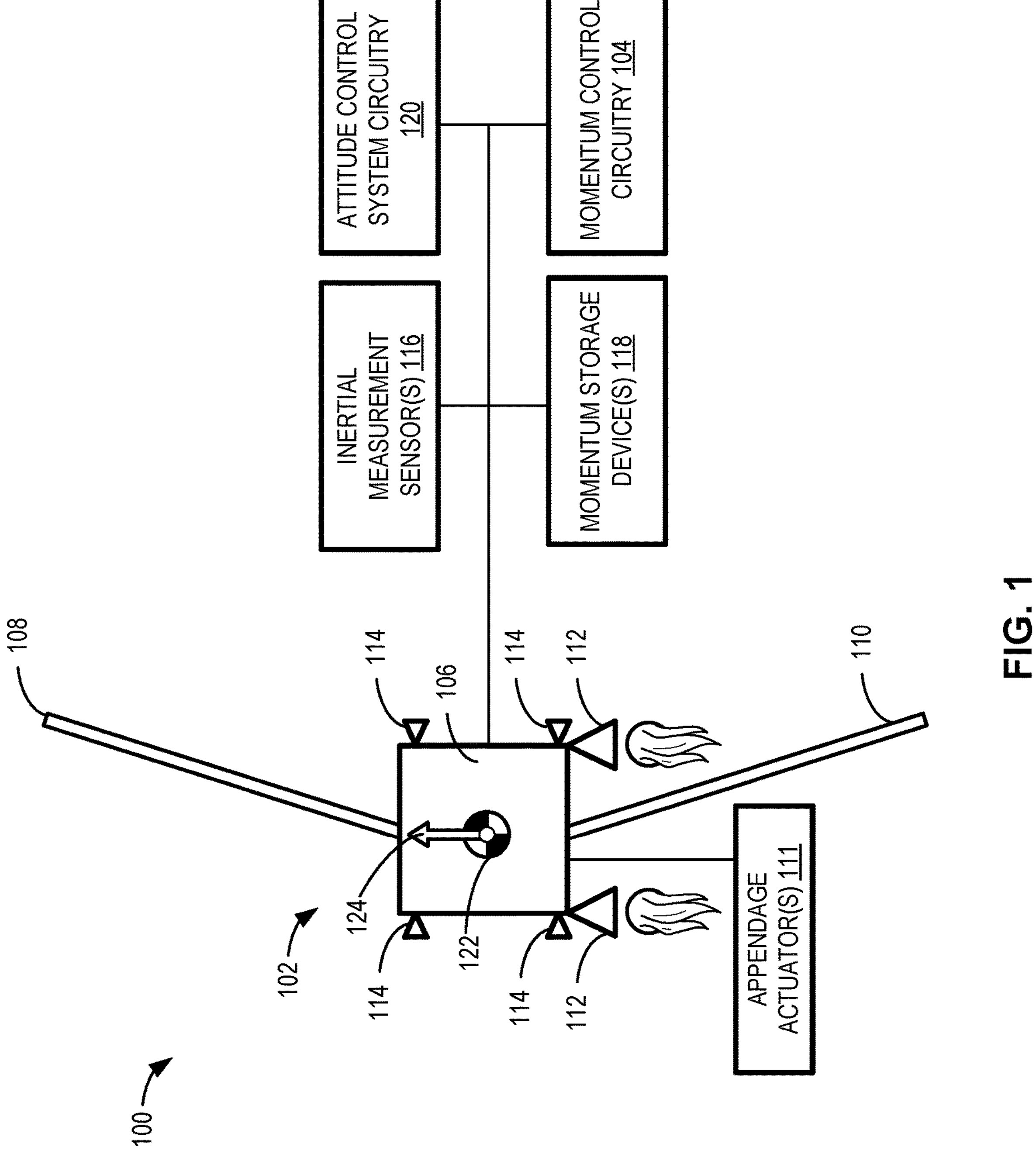
FIG. 1 illustrates an example system including a spacecraft and example momentum control circuitry to manage momentum storage at the spacecraft.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein integrated circuit/circuitry is defined as one or more semiconductor packages containing one or more circuit elements such as transistors, capacitors, inductors, resistors, current paths, diodes, etc. For example, an integrated circuit may be implemented as one or more of an ASIC, an FPGA, a chip, a microchip, programmable circuitry, a semiconductor substrate coupling multiple circuit elements, a system on chip (SoC), etc.

DETAILED DESCRIPTION

A spacecraft may perform orbit control and maintenance maneuvers such as station keeping and station change. Firing of thrusters of the spacecraft to perform the maneuvers may generate torques at the spacecraft. To prevent the torques from causing unintended rotation of the spacecraft, the torques are stored as angular momentum (also referred to as rotational momentum) by momentum storage devices of the spacecraft. The momentum storage devices can include, for example, reaction wheels or control moment gyroscopes. A momentum storage device such as a reaction wheel has design limitations with respect to a maximum angular velocity at which the wheel can rotate. The rotational speed of the reaction wheel may be periodically changed to manage momentum at the reaction wheel to prevent the reaction wheel from reaching the maximum angular velocity. However, changing the rotational speed of the reaction wheel without firing thrusters results in the momentum being transferred to the body of the spacecraft (e.g., total momentum is conserved), which causes the spacecraft to rotate and, thus, affects the attitude of the spacecraft. Momentum is unloaded from the momentum storage devices (e.g., reaction wheel(s)) by firing reaction control thrusters. However, firing the reaction control thrusters for purposes removing stored momentum results in wasted consumption of propellant.

A known method for mitigating accumulation of angular momentum during performance of thrusting maneuvers includes off-pulsing the thrusters, or turning on and off firing of specific thrusters for periods of time. Off-pulsing can mitigate momentum accumulation by balancing net torques over the duration of thrusting maneuvers. However, off-pulsing can reduce the net thrust generated by the thrusters. Another known method for mitigating changes in momentum storage at a spacecraft during thrusting maneuvers includes the use of gimbaled thrusters. In thruster gimbaling, an orientation of the respective thrusters (e.g., electric propulsion thrusters) can be adjusted via a corresponding gimbal to align the net thrust vector through a center of mass (or center of gravity) of the spacecraft to minimize a change in stored momentum. However, thruster gimbals can be expensive. Also, not all thrusters accommodate gimballing. Another known method for mitigating changes in momentum storage includes sequenced timing of multiple thrusters (e.g., electric propulsion thrusters such as arcjets). This method involves firing a set of thrusters, which achieves a portion of a maneuver but changes the momentum state. Subsequent burns are performed (based on a sequence) using different thrusters such that the net effect is a particular burn (delta-V) and net zero change in momentum. However, such methods involve consumption of processing resources (e.g., software) to identify an optimal sequence for achieving both net thrust and zero net momentum in advance of execution. However, such pre-planning of the sequence does not account for disturbances and uncertainties that may arise during execution of the sequence. Thus, additional firing of the thrusters may occur. Therefore, although sequenced firing can be used with thrusters that are not designed to gimbal, such a burn sequence can still result in wasted consumable propellant.

Disclosed herein are example systems, apparatus, and methods to reduce or fully mitigate changes in stored angular momentum during thrusting maneuvers. Rather than generating momentum as a result of firing of the thrusters during the performance of maneuvers, examples disclosed herein prevent or substantially reduce the creation of momentum during the maneuvers. Examples disclosed herein adjust a center of mass of the spacecraft to facilitate alignment between the net thrust vector and the center of mass. Examples disclosed herein adjust the center of mass of the spacecraft by controlling a position of appendages of the spacecraft, such as solar arrays. For example, data associated with inertial measurement sensor(s) and momentum storage device(s) of the spacecraft can be monitored to detect a change in momentum stored at the spacecraft and to initiate movement of the appendage(s) to dynamically position the center of mass during thrusting maneuvers. The position and/or the orientation of appendage(s) can be adjusted to optimize alignment of the net thrust vector with the center of mass of the spacecraft (e.g., the net thrust vector passes through the center of mass).

As a result of movement of the appendage(s) to adjust the center of mass of the spacecraft and facilitate alignment with the net thrust vector, examples disclosed herein substantially minimize or prevent generation of momentum that would otherwise be stored at the momentum storage devices (e.g., reaction wheel(s)) of the spacecraft during thrusting maneuvers. Accordingly, examples disclosed herein eliminate or substantially reduce the need for momentum unloading due to orbit maintenance (e.g., orbital maneuvering using thrusters). As a result, instances in which the reaction control thrusters are fired for purposes of momentum unloading in connection with orbital maneuvering are eliminated or substantially reduced, thereby conserving propellant and/or reducing an amount of propellant loaded onto the spacecraft before launch. Conservation of propellant can extend a duration of time for which the satellite can operate in orbit. A reduction in the amount of propellant carried by the spacecraft can reduce a size of the propulsion system of the aircraft, thereby reducing spacecraft size, weight, and associated costs.

Examples disclosed herein can identify changes in total angular momentum of the spacecraft during performance of the thrusting maneuvers. Examples disclosed herein determine (e.g., estimate, compute) total angular momentum for the spacecraft based on stored momentum at the momentum storage devices and spacecraft body rotation (e.g., angular rate, rotation rate, spin rate of the spacecraft body) determined from inertial measurement sensor data. Examples disclosed herein monitor the total spacecraft angular momentum to determine changes in the angular momentum state of the spacecraft. For example, examples disclosed herein determine if momentum is being accumulated as indicated by a change in total momentum state estimated from the inertial measurement unit and stored momentum (where accumulation is an increase in the magnitude of the momentum state in either the positive or negative direction. A decreasing momentum state reduces the positive or negative momentum magnitude toward zero.). In response to the detection of momentum change, examples disclosed herein can adjust the position of the appendages to dynamically position the center of mass to facilitate (e.g., optimize) alignment between the spacecraft center of mass and the net thrust vector. As a result, examples disclosed herein mitigate changes in stored momentum at the spacecraft via adjustment(s) of the appendage(s). Examples disclosed herein provide alternatives to momentum management techniques such as off-pulsing and thruster gimbaling to achieve substantially net zero momentum changes during thrusting maneuvers (e.g., zero or substantially zero increase or decrease momentum stored at the spacecraft).

FIG. 1 illustrates an example system 100 including a spacecraft 102 and momentum control circuitry 104 for managing angular momentum stored at the spacecraft 102. The example spacecraft 102 can include, for example, a satellite such as a geosynchronous satellite. The example spacecraft 102 of FIG. 1 includes a body 106, a first appendage 108 carried by the body 106, and a second appendage 110 carried by the body 106. In the example of FIG. 1, the first appendage 108 includes a first solar array moveably (e.g., rotatably) coupled to a first portion of the body 106 and the second appendage 110 includes a second solar array moveably (e.g., rotatably) coupled to a second portion of the body 106. The spacecraft 102 includes actuators 111 to cause the first appendage 108 and/or the second appendage 110 to move (e.g., in response to movement of the sun over time). The spacecraft 102 can additionally or alternatively include other types of appendages supported by the body 106, such as radiator panel(s), antenna(s), reflector(s), and/or payload(s).

In the example of FIG. 1, attitude control, translational control (thrusting delta-V maneuvers), and momentum management for the spacecraft 102 are provided by a guidance, navigation, and control (GNC) system of the spacecraft 102. For example, the spacecraft 102 includes an attitude control system to control an attitude and a position of the spacecraft 102 in orbit. As disclosed herein, the attitude control system uses components such as thrusters 112, 114; inertial measurement sensor(s) 116 (e.g., an inertial measurement unit (IMU)); and momentum storage device(s) 118 (e.g., reaction wheel(s), control moment gyroscope(s)) of the spacecraft 102 to control an attitude and a position of the spacecraft 102, management momentum, etc. The attitude control system includes attitude control system circuitry 120 (e.g., programmable circuitry) to output instructions to control, for example, an orientation of the spacecraft 102.

For example, the spacecraft 102 of FIG. 1 includes a plurality of thrusters 112 carried by the body 106 of the spacecraft 102. Two of the thrusters 112 are shown in FIG. 1 for illustrative purposes; the example spacecraft 102 can include additional thrusters 112. The thrusters 112 generate thrust to facilitate movement of the spacecraft 102 for station-keeping maneuvers, attitude control maneuvers, etc. The thrusters 112 can include chemical thrusters that expel propellant as a result of chemical reactions. In some examples, the thrusters 112 operate based on electric propulsion. In some examples, the thrusters 112 provide for electrically augmented chemical propulsion in which electrical energy is used to increase thermal energy of the propellant.

The example spacecraft 102 of FIG. 1 includes a plurality of reaction control system (RCS) thrusters 114 carried by the spacecraft body 106. Four RCS thrusters 114 are shown in FIG. 1 for illustrative purposes; the example spacecraft 102 can include additional or fewer RCS thrusters 114. The RCS thrusters 114 can include chemical thrusters, electric thrusters, and/or electrically augmented chemical propulsion thrusters. The firing of the thruster(s) 112 for spacecraft maneuvers may result in angular momentum that is stored by momentum storage device(s) 118 of the spacecraft 102 (e.g., to prevent unintended rotation of the spacecraft body 106). The RCS thruster(s) 114 generate thrust to unload momentum stored by the momentum storage device(s) 118 to enable the momentum storage device(s) 118 to change their momentum state without causing, for example, changes to an orientation of the spacecraft body 106. In some examples, the RCS thruster(s) 114 generate thrust for performance of maneuvers by the spacecraft 102 (e.g., in addition to or alternative to the thruster(s) 112).

In the example of FIG. 1, the attitude control system circuitry 120 of the spacecraft 102 generates instructions to control attitude and orbit of the spacecraft 102 based on, for example, outputs of the inertial measurement sensor(s) 116. The GNC system of the spacecraft 102 can cause the thruster(s) 112 to fire to facilitate the performance of maneuvers (e.g., station-keeping maneuvers) by the spacecraft 102. Firing of the thruster(s) 112 can result in angular momentum that is stored by the momentum storage devices 118 of the spacecraft 102. The attitude control system circuitry 120 can cause the RCS thruster(s) 114 to fire to generate torque to change the total momentum state of the spacecraft 102 (e.g., unload or dump stored momentum) while maintaining, for example, body pointing of the spacecraft 102.

In the example of FIG. 1, the momentum control circuitry 104 mitigates or eliminates changes to the total angular momentum stored at the spacecraft 102 during maneuvers by adjusting a center of mass 122 of the spacecraft 102. In particular, the momentum control circuitry 104 causes the center of mass 122 to be adjusted to facilitate alignment of a net thrust vector resulting from the firing of the thruster(s) 112 through the center of mass 122. The net thrust vector represents the net force generated by the firing of the thruster(s) 112 (e.g., a sum of the force vectors generated at each thruster 112) and is represented by the arrow 124 in FIG. 1. In the example of FIG. 1, the momentum control circuitry 104 generates instructions for one or more of the appendages 108, 110 to move relative to the spacecraft body 106 to cause the center of mass 122 to change based on the direction of the net thrust vector.

For example, the momentum control circuitry 104 can communicate with the attitude control system circuitry 120 or, more generally, the GNC system of the spacecraft 102, to receive notice that the thruster(s) 112 are firing during execution of maneuvers by the spacecraft 102. During the firing of the thrusters 112, the momentum control circuitry 104 monitors input signals associated with the attitude control system, such as body angular rates or angular accelerations measured by the inertial measurement sensor(s) 116 (e.g., inertial measurement unit(s)), stellar-inertial reference unit(s)). For instance, the body angular rates or angular accelerations can indicate that the body 106 of the spacecraft 102 is rotating (e.g., spinning). The momentum control circuitry 104 also monitors telemetry data associated with the momentum storage device(s) 118 to determine momentum stored by the momentum storage device(s) 118. The telemetry data can include, for example, rotational speed of the reaction wheel(s) 118.

The momentum control circuitry 104 determines total angular momentum for the spacecraft 102 based on the outputs of the inertial measurement sensor(s) 116 indicative of an angular rate (rotation rate) of the body 106 and the momentum stored in the momentum storage device(s) 118. In particular, the momentum control circuitry 104 determines a total angular momentum state of the spacecraft based on a combination of the body angular rate and total momentum stored in the momentum storage device(s) 118. The momentum control circuitry 104 can determine the total angular momentum state periodically during the thrusting maneuvers (e.g., at a first time, a second time) based on, for example, a frequency at which data is received from the inertial measurement sensor(s) 116 and the momentum storage device(s) 118, some other predefined intervals, etc.

The momentum control circuitry 104 monitors the total angular momentum state of the spacecraft 102 during station keeping or station change maneuvers to detect changes in the total angular momentum state (e.g., based on data indicative of changes to the body rotation rate). For example, the momentum control circuitry 104 can detect a change between total angular momentum associated with a first time (e.g., where the first time is before the thrusting maneuver or during the thrusting maneuver) and total angular momentum associated with a second time (e.g., where the second time is during the thrusting maneuver after the first time). In examples disclosed herein, when the momentum control circuitry 104 detects a change in the total angular momentum state of the spacecraft 102, the momentum control circuitry 104 determines that there is misalignment between the net thrust vector 124 and the center of mass 122 of the spacecraft 102. Put another way, if there are changes in the total angular momentum state of the spacecraft 102 during thrusting maneuvers, the momentum control circuitry 104 determines that the net thrust vector 124 is not passing through or not substantially aligned with the center of mass 122 of the spacecraft 102.

If the center of mass 122 and the net thrust vector 124 are not aligned or substantially aligned, then the thrusting maneuvers will result in changes to momentum stored at the spacecraft 102 (e.g., undesired increase or decrease in stored momentum). In the example of FIG. 1, if the momentum control circuitry 104 determines that the net thrust vector 124 and the center of mass 122 are not aligned or not substantially aligned (e.g., based on changes in the total angular momentum state of spacecraft as determined from the body angular rate (e.g., rotational rate of body 106) measured by the inertial measurement sensor(s) 116 and the stored momentum state of the momentum storage device(s) 118), then the momentum control circuitry 104 generates instructions to cause a position and/or an orientation of one or more of the appendages 108, 110 to change relative to the spacecraft body 106. In particular, the momentum control circuitry 104 instructs the position and/or the orientation of the appendage(s) 108, 110 to change to cause the center of mass 122 of the spacecraft 102 to be adjusted. For example, the momentum control circuitry 104 can send instructions to the actuator(s) 111 associated with the appendage(s) 108, 110 to cause the appendage(s) 108, 110 to tilt, to pivot, etc. relative to the spacecraft body 106.

After the adjustments to the appendage(s) 108, 110 are implemented, the momentum control circuitry 104 monitors the outputs of the inertial measurement sensor(s) 116 and the telemetry associated with the momentum storage device(s) 118 to identify any (further) changes in total angular momentum of the spacecraft 102 during the thrusting maneuvers. If the momentum control circuitry 104 detects (additional) changes to the total angular momentum state of the spacecraft 102 (e.g., based on changes to body rotation rate), the momentum control circuitry 104 determines that further adjustments to the position and/or the orientation of the appendage(s) 108, 110 should be made to increase alignment between the net thrust vector 124 and the center of mass 122 of the spacecraft 102. The momentum control circuitry 104 outputs instructions to cause further adjustments to the position and/or the orientation of the appendage(s) 108, 110 until the outputs of the inertial measurement sensor(s) 116 and/or the telemetry state of the momentum storage device(s) 118 and, thus, the resulting total spacecraft angular momentum determined therefrom, indicate that there is no or substantially no change (e.g., zero increase/decrease) in momentum stored at the spacecraft 102.

As a result of the adjustments to the appendage(s) 108, 110 and, thus, the center of mass 122 of the spacecraft 102, the net thrust vector 124 passes through or is substantially aligned with the center of mass 122, which minimizes or prevents changes in momentum stored at the spacecraft 102 during the thrusting maneuvers. Thus, in some examples, momentum unloading operations do not need to be performed, thereby saving fuel as the RCS thrusters 114 do not need to be fired. In some examples, some stored momentum is released via momentum unloading operations, however, the amount of momentum released is reduced due to the efforts to align the net thrust vector 124 and the center of mass 122.

Figure 2:
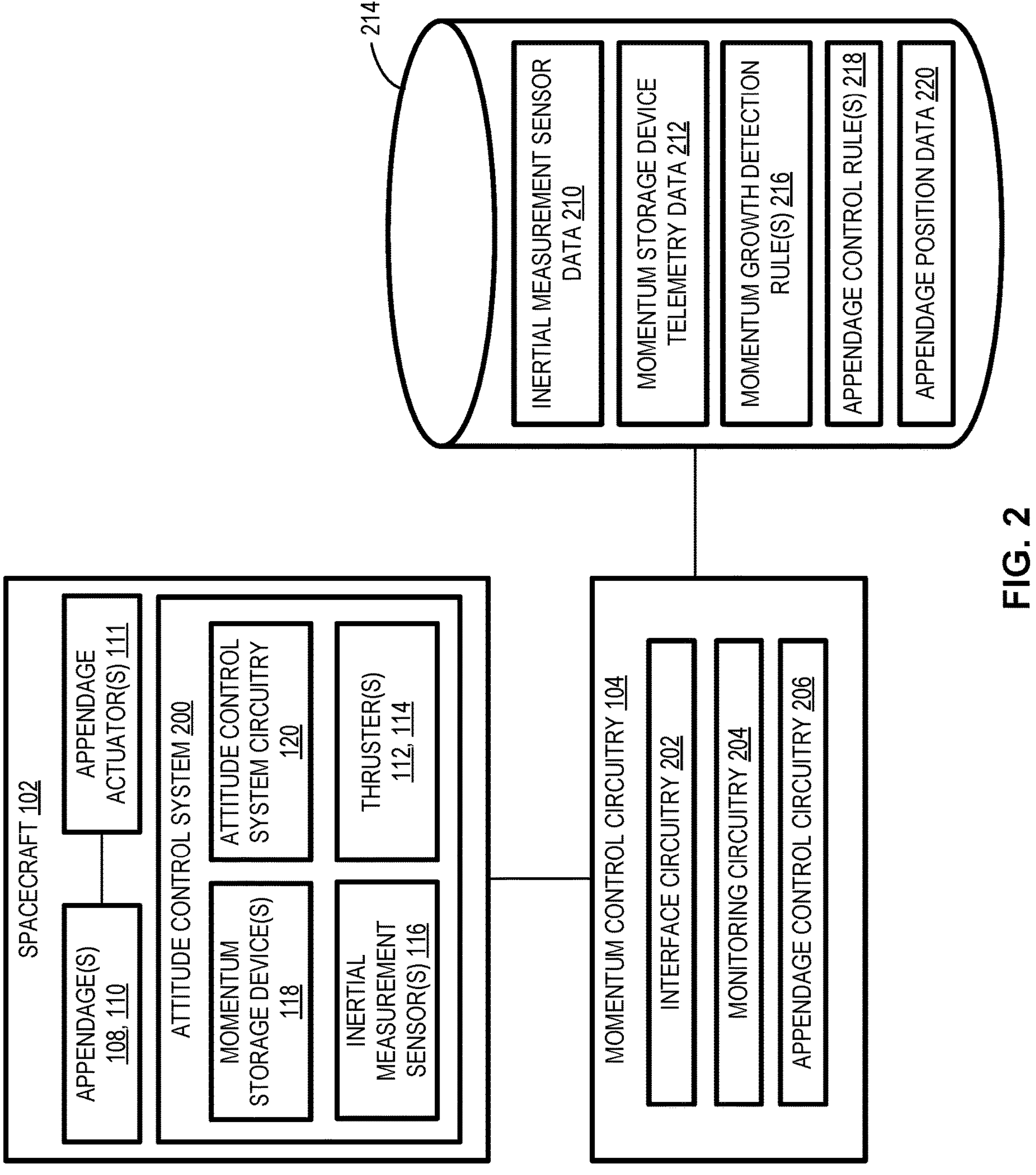
FIG. 2 is a block diagram of an example implementation of the momentum control circuitry of FIG. 1.

FIG. 2 is a block diagram of an example implementation of the momentum control circuitry 104 of FIG. 1 to mitigate or negate accumulation of momentum at the spacecraft 102 of FIG. 1 during performance of thrusting maneuvers. The momentum control circuitry 104 of FIG. 2 may be instantiated (e.g., creating an instance of, bring into being for any length of time, materialize, implement, etc.) by programmable circuitry such as a Central Processor Unit (CPU) executing first instructions. Additionally or alternatively, the momentum control circuitry 104 of FIG. 2 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 2 may, thus, be instantiated at the same or different times. Some or all of the circuitry of FIG. 2 may be instantiated, for example, in one or more threads executing concurrently on hardware and/or in series on hardware. Moreover, in some examples, some or all of the circuitry of FIG. 2 may be implemented by microprocessor circuitry executing instructions and/or FPGA circuitry performing operations to implement one or more virtual machines and/or containers.

The momentum control circuitry 104 is associated with the guidance, navigation, and control (GNC) system of the spacecraft 102. For instance, the momentum control circuitry 104 can be associated with an attitude control system 200 of the spacecraft 102. In some examples, one or more components of the momentum control circuitry 104 are implemented by, for example, the attitude control system circuitry 120 of the spacecraft 102. In some examples, one or more components of the momentum control circuitry 104 are implemented by, for example, programmable circuitry of one or more cloud-based devices in communication with the momentum control circuitry 104.

The example momentum control circuitry 104 of FIG. 1 includes thruster status detection circuitry 202, monitoring circuitry 204, and appendage control circuitry 206. In some examples, the thruster status detection circuitry 202 is instantiated by programmable circuitry executing thruster status detection instructions and/or configured to perform operations such as those represented by the flowchart of FIG. 3. In some examples, the monitoring circuitry 204 is instantiated by programmable circuitry executing monitoring instructions and/or configured to perform operations such as those represented by the flowchart of FIG. 3. In some examples, the appendage control circuitry 206 is instantiated by programmable circuitry executing appendage control instructions and/or configured to perform operations such as those represented by the flowchart of FIG. 3.

As disclosed in connection with FIG. 1, the thruster(s) 112 are fired to enable the spacecraft 102 to perform thrusting maneuvers. Firing of the thruster(s) 112 generates momentum that is absorbed by, for example, the momentum storage device(s) 118 of the spacecraft 102. If the momentum storage device(s) 118 approach a saturation point (e.g., rotating at a maximum speed), momentum unloading operations may be performed by causing the RCS thruster(s) 114 to fire to enable the momentum storage device(s) 118 to change their momentum state(s).

In the example of FIG. 2, the thruster status detection circuitry 202 of the example momentum control circuitry 104 receives an indication that the thruster(s) 112 are firing or are expected to fire (e.g., within a particular period of time) to facilitate performance of thrusting maneuvers (e.g., station keeping maneuvers) by the spacecraft 102. For example, the thruster status detection circuitry 202 can communicate with the attitude control system circuitry 120 or, more generally, the GNC system of the spacecraft 102, to receive notice that the thruster(s) 112 are firing or are expected to fire as part of thrusting maneuvers. In some examples, the thruster status detection circuitry 202 can receive telemetry data indicating that the thruster(s) 112 are in an operative state.

In response to an indication that the thruster(s) 112 are firing or expect to fire, the thruster status detection circuitry 202 accesses inertial measurement sensor data 210 corresponding to outputs of the inertial measurement sensor(s) 116 and telemetry data 212 associated with the momentum storage device(s) 118 (e.g., reaction wheel(s), control moment gyros). The inertial measurement sensor data 210 includes body angular or rotation rate for the spacecraft 102. The telemetry data 212 includes data associated with momentum stored at the momentum storage device(s) 118, such as rotational speed of the reaction wheel. The thruster status detection circuitry 202 can access the inertial measurement sensor data 210 and/or the momentum storage device telemetry data 212 prior to, during, and/or after firing of the thruster(s) 112. The inertial measurement sensor data 210 and the momentum storage device telemetry data 212 are stored in a database 214. In some examples, the momentum control circuitry 104 includes the database 214. In some examples, the database 214 is in a location accessible to the momentum control circuitry 104 as shown in FIG. 2.

The monitoring circuitry 204 of the example momentum control circuitry 104 analyzes the inertial measurement sensor data 210 and the momentum storage device telemetry data 212 to determine if momentum is changing at the spacecraft 102 over time in connection with firing of the thruster(s) 112. In particular, the monitoring circuitry 204 determines a total angular momentum state of the spacecraft 102 at a given time (e.g., a first time and a second time after the first time) based on the body angular rate data and the stored momentum at the momentum storage device(s) 118. The monitoring circuitry 204 monitors for changes in the total angular momentum state over time (e.g., a change in total angular momentum state between the first time and the second time). The change in total angular momentum state (e.g., due to changes in body rotation rate) indicates misalignment between the net thrust vector 124 associated with the thruster(s) 112 and the center of mass 122 of the spacecraft 102. As disclosed herein, if the total angular momentum state of the spacecraft 102 is changing, then the monitoring circuitry 204 determines that the center of mass 122 of the spacecraft 102 should be adjusted to facilitate alignment between the center of mass and a net thrust vector (e.g., the net thrust vector passes through the center of mass). In particular, the monitoring circuitry 204 determines that the center of mass 122 should be adjusted to mitigate changes to the total angular momentum state (e.g., changes in storage of momentum) at the spacecraft 102. If the total angular momentum is unchanging at the spacecraft 102 during thrusting, then the monitoring circuitry 204 determines that the net thrust vector is aligned or substantially aligned trough the center of mass (or some other torque or momentum is managing the effect of thrusting maneuvers).

In some examples, the monitoring circuitry 204 executes momentum storage detection rule(s) 216 to determine if total angular momentum is changing at the spacecraft 102 due to the thrusting maneuvers based on the inertial measurement sensor data 210 and the momentum storage device telemetry data 212. The momentum storage detection rule(s) 216 can include threshold values indicative of changes in angular momentum storage at the spacecraft 102. For example, the momentum storage detection rule(s) 216 can define threshold spin rates of the reaction wheels, threshold angular acceleration ranges for the inertial measurement sensor data, etc. When the values associated with the inertial measurement sensor data 210 and the momentum storage device telemetry data 212 (i.e., total angular momentum) do not satisfy the threshold value(s), the monitoring circuitry 204 determines that momentum is changing at the spacecraft 102. The momentum storage detection rule(s) 216 can be defined by, for example, user input(s).

In the example of FIG. 2, the monitoring circuitry 204 outputs notification(s), flag(s), and/or alert(s) when the inertial measurement sensor data 210 and the momentum storage device telemetry data 212 indicate changes in stored momentum at the spacecraft 102 in connection with performance of thrusting maneuvers (e.g., the total angular momentum state indicates increased momentum storage). In response to the alert(s) output by the monitoring circuitry 204, the appendage control circuitry 206 generates instructions to cause a position and/or an orientation of one or more of the appendages 108, 110 (e.g., solar panel(s), radiator panel(s)) to change. As a result of the adjustment(s) to the appendage(s) 108, 110, the center of mass 122 of the spacecraft 102 changes. In particular, the appendage control circuitry 206 controls the actuator(s) 111 to adjust the center of mass 122 to align or substantially align the center of mass 122 and the net thrust vector 124 resulting from forces generated by the thruster(s) 112.

For example, the appendage control circuitry 206 can generate instructions that are output to the appendage actuator(s) 111 to cause the actuator(s) 111 to move the appendage(s) 108, 110 relative to the spacecraft body 106. Based on the instructions from the appendage control circuitry 206, the actuator(s) 111 cause the appendage(s) 108, 110 to, for example, rotate, tip, tilt, etc. relative to the spacecraft body 106. The appendage control circuitry 206 generates the instructions based on appendage control rule(s) 218. The appendage control rule(s) 218 can define which of the appendage(s) 108, 110 (e.g., the solar panel(s), the radiator panel(s)) to move to minimize disruption to other functions (e.g., signal transmission functions, antenna coverage) of the spacecraft 102. The appendage control rule(s) 218 can define constraints or parameters for movement of the appendage(s) 108, 110. For example, the appendage control rule(s) 218 can define an amount of rotation, a degree of tilt, etc. of an appendage 108, 110 each time the position or orientation of the appendage 108, 110 is adjusted. The appendage control rule(s) 218 can define criteria or parameters for moving appendages to prevent interference between two or more appendages (e.g., rule(s) to prevent a solar array and an antenna from being tilted such that the two appendages may come in contact). The appendage control rule(s) 218 can be defined based on user inputs and stored in the database 214.

The monitoring circuitry 204 and the appendage control circuitry 206 define a feedback loop to determine (a) if the adjustments to the appendage(s) 108, 110 have minimized or negated momentum changes at the spacecraft 102, thereby indicating that the center of mass 122 and the net thrust vector 124 are aligned or substantially aligned, or (b) whether additional adjustment(s) to the position and/or the orientation the appendage(s) 108, 110 should be performed to further reduce or attempt to negate changes in momentum stored at the spacecraft 102 during thrusting maneuvers. The monitoring circuitry 204 determines the total angular momentum state of the spacecraft 102 after the adjustment(s) to the appendage(s) 108, 110. For example, after the position and/or the orientation of the appendage(s) 108, 110 has been adjusted, the monitoring circuitry 204 can monitor the inertial measurement sensor data 210 and the momentum storage device telemetry data 212 collected after the adjustment(s) the appendage(s) 108, 110 to identify whether there are changes indicative of zero or substantially zero additional momentum stored at the spacecraft 102 during firing of the thruster(s) 112 (e.g., the total angular momentum state indicates zero increase/decrease in stored momentum). Put another way, the monitoring circuitry 204 observes the inertial measurement sensor data 210 and the momentum storage device telemetry data 212 for indicators that changes in the storage of momentum have been negated (e.g., zeroed out) or substantially negated as a result of the adjustment(s) to the appendage(s) 108, 110.

In some examples, the monitoring circuitry 204 compares the inertial measurement sensor data 210 and/or the momentum storage device telemetry data 212 collected after the adjustment(s) to the appendage(s) 108, 110 to the thresholds defined by the momentum storage detection rule(s) 216 to detect the spacecraft momentum state resulting from the adjustment(s) to the appendage(s) 108, 110 and, thus, the adjustment to the center of mass. In some examples, based on the momentum storage detection rule(s) 216, the monitoring circuitry 204 determines that there are changes to the stored momentum despite the adjustment(s) to the appendage(s) 108, 110. In such examples, the monitoring circuitry 204 notifies the appendage control circuitry 206 that the center of mass 122 should be further adjusted via movement of the appendage(s) 108, 110. In response, the appendage control circuitry 206 generates additional instructions to cause the actuator(s) 111 to move the appendage(s) 108, 110 to re-position the center of mass 122. The monitoring circuitry 204 re-evaluates the state of momentum storage at the spacecraft 102 after the further adjustment(s) to the appendage(s) 108, 110. Thus, the monitoring circuitry 204 and the appendage control circuitry 206 define a feedback loop to provide for dynamic positioning of the center of mass 122 to prevent, reduce, or otherwise mitigate changes in stored momentum during thrusting movements by the spacecraft 102.

In some examples, the monitoring circuitry 204 determines, based on the momentum storage detection rule(s) 216, that the adjustment(s) to the appendage(s) 108, 110 and resulting alignment or substantial alignment between the net thrust vector 124 and the center of mass 122 resulted in net zero momentum changes during thrusting maneuvers (e.g., zero or substantially zero increase or decrease momentum stored at the spacecraft). For example, the monitoring circuitry 204 can determine that the rotational speed of the reaction wheel(s) is not increasing and/or has maintained below a threshold value for a period time. Also, the inertial measurement sensor data 210 can indicate no changes or negligible changes in body rotation rate. In such examples, the monitoring circuitry 204 determines that the center of mass 122 and the net thrust vector 124 are aligned or substantially aligned as result of adjustments to the appendage(s) 108, 110 and the appendage(s) 108, 110 should be maintained in the adjusted position(s) and/or orientation(s).

In some examples, the monitoring circuitry 204 can store the position(s) and/or the orientation(s) of the appendage(s) 108, 110 that minimized or negated changes in momentum storage as appendage position data 220. In some examples, the appendage control circuitry 206 uses the historical appendage position data 220 to cause the appendage(s) 108, 110 to move to particular position(s) and/or orientation(s) in response to future notifications that the thruster(s) 112 are firing or expected to fire (e.g., in connection with performance of thrusting maneuvers at a later time). Such preemptive adjustments to the appendage(s) 108, 110 and, thus, the center of mass 122 of the spacecraft 102, can prevent or reduce changes to stored momentum and/or reduce the amount of time to align the center of mass 122 and the net thrust vector 124 during future thrusting maneuvers.

Although examples disclosed herein discuss monitoring for changes in total angular momentum at the spacecraft 102 from firing the thruster(s) 112 based on outputs of the inertial measurement sensor(s) 116 and telemetry associated with the momentum storage device(s) 118, other methods for identifying misalignment between the center of mass 122 and the net thrust vector 124 can be used. For example, the monitoring circuitry 204 can use data from IMU linear accelerometers and gyroscopes to measure linear accelerations and rotational accelerations induced by individual thruster firing. Based on known thruster position and orientation, the monitoring circuitry 204 estimates the center of mass.

In some examples, after the appendage(s) 108, 110 have been adjusted to position(s) and/or orientation(s) associated with minimum momentum changes (e.g., net zero or substantially zero changes (increase or decrease) in stored momentum), the monitoring circuitry 204 may determine that any stored momentum should be released based on the momentum storage device telemetry data 212 (e.g., momentum stored prior to adjustment(s) to the appendage(s)). For instance, the monitoring circuitry 204 can determine that momentum unloading should be performed to maintain a rotational speed of a reaction wheel below a threshold. In such examples, the monitoring circuitry 204 can communicate with the attitude control system circuitry 120 to, for instance, cause the RCS thruster(s) 114 to fire to enable the momentum storage device(s) 118 to change momentum state. In such examples, because changes in stored momentum has been negated or substantially negated at the spacecraft 102 as a result of the alignment between the center of mass 122 and the net thrust vector 124, any momentum released is reduced as compared to if the center of mass 122 and the net thrust vector 124 were not aligned.

In some examples, the momentum control circuitry 104 includes means for detecting thruster status. For example, the means for detecting may be implemented by the thruster status detection circuitry 202. In some examples, the thruster status detection circuitry 202 may be instantiated by programmable circuitry such as the example programmable circuitry 412 of FIG. 4. For instance, the thruster status detection circuitry 202 may be instantiated by the example microprocessor 500 of FIG. 5 executing machine executable instructions such as those implemented by at least blocks 302, 316 of FIG. 3. In some examples, the thruster status detection circuitry 202 may be instantiated by hardware logic circuitry, which may be implemented by an ASIC, XPU, or the FPGA circuitry 600 of FIG. 6 configured and/or structured to perform operations corresponding to the machine-readable instructions. Additionally or alternatively, the thruster status detection circuitry 202 may be instantiated by any other combination of hardware, software, and/or firmware. For example, the thruster status detection circuitry 202 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine-readable instructions and/or to perform some or all of the operations corresponding to the machine-readable instructions without executing software or firmware, but other structures are likewise appropriate.

In some examples, the momentum control circuitry 104 includes means for monitoring. For example, the means for monitoring may be implemented by the monitoring circuitry 204. In some examples, the monitoring circuitry 204 may be instantiated by programmable circuitry such as the example programmable circuitry 412 of FIG. 4. For instance, the monitoring circuitry 204 may be instantiated by the example microprocessor 500 of FIG. 5 executing machine executable instructions such as those implemented by at least blocks 304, 306, 310, 312, 318 of FIG. 3. In some examples, the monitoring circuitry 204 may be instantiated by hardware logic circuitry, which may be implemented by an ASIC, XPU, or the FPGA circuitry 600 of FIG. 6 configured and/or structured to perform operations corresponding to the machine-readable instructions. Additionally or alternatively, the monitoring circuitry 204 may be instantiated by any other combination of hardware, software, and/or firmware. For example, the monitoring circuitry 204 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine-readable instructions and/or to perform some or all of the operations corresponding to the machine-readable instructions without executing software or firmware, but other structures are likewise appropriate.

In some examples, the momentum control circuitry 104 includes means for controlling an appendage. For example, the means for controlling may be implemented by the appendage control circuitry 206. In some examples, the appendage control circuitry 206 may be instantiated by programmable circuitry such as the example programmable circuitry 412 of FIG. 4. For instance, the appendage control circuitry 206 may be instantiated by the example microprocessor 500 of FIG. 5 executing machine executable instructions such as those implemented by at least block 308 of FIG. 3. In some examples, the appendage control circuitry 206 may be instantiated by hardware logic circuitry, which may be implemented by an ASIC, XPU, or the FPGA circuitry 600 of FIG. 6 configured and/or structured to perform operations corresponding to the machine-readable instructions. Additionally or alternatively, the appendage control circuitry 206 may be instantiated by any other combination of hardware, software, and/or firmware. For example, the appendage control circuitry 206 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine-readable instructions and/or to perform some or all of the operations corresponding to the machine-readable instructions without executing software or firmware, but other structures are likewise appropriate.

While an example manner of implementing the momentum control circuitry 104 of FIG. 1 is illustrated in FIG. 2, one or more of the elements, processes, and/or devices illustrated in FIG. 2 may be combined, divided, re-arranged, omitted, eliminated, and/or implemented in any other way. Further, the example thruster status detection circuitry 202, the example monitoring circuitry 204, the example appendage control circuitry 206 and/or, more generally, the example momentum control circuitry 104 of FIG. 2, may be implemented by hardware alone or by hardware in combination with software and/or firmware. Thus, for example, any of the example thruster status detection circuitry 202, the example monitoring circuitry 204, the example appendage control circuitry 206, and/or, more generally, the example momentum control circuitry 104, could be implemented by programmable circuitry in combination with machine-readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, the example momentum control circuitry 104 of FIG. 2 may include one or more elements, processes, and/or devices in addition to, or instead of, those illustrated in FIG. 2, and/or may include more than one of any or all of the illustrated elements, processes and devices.

Figure 3:
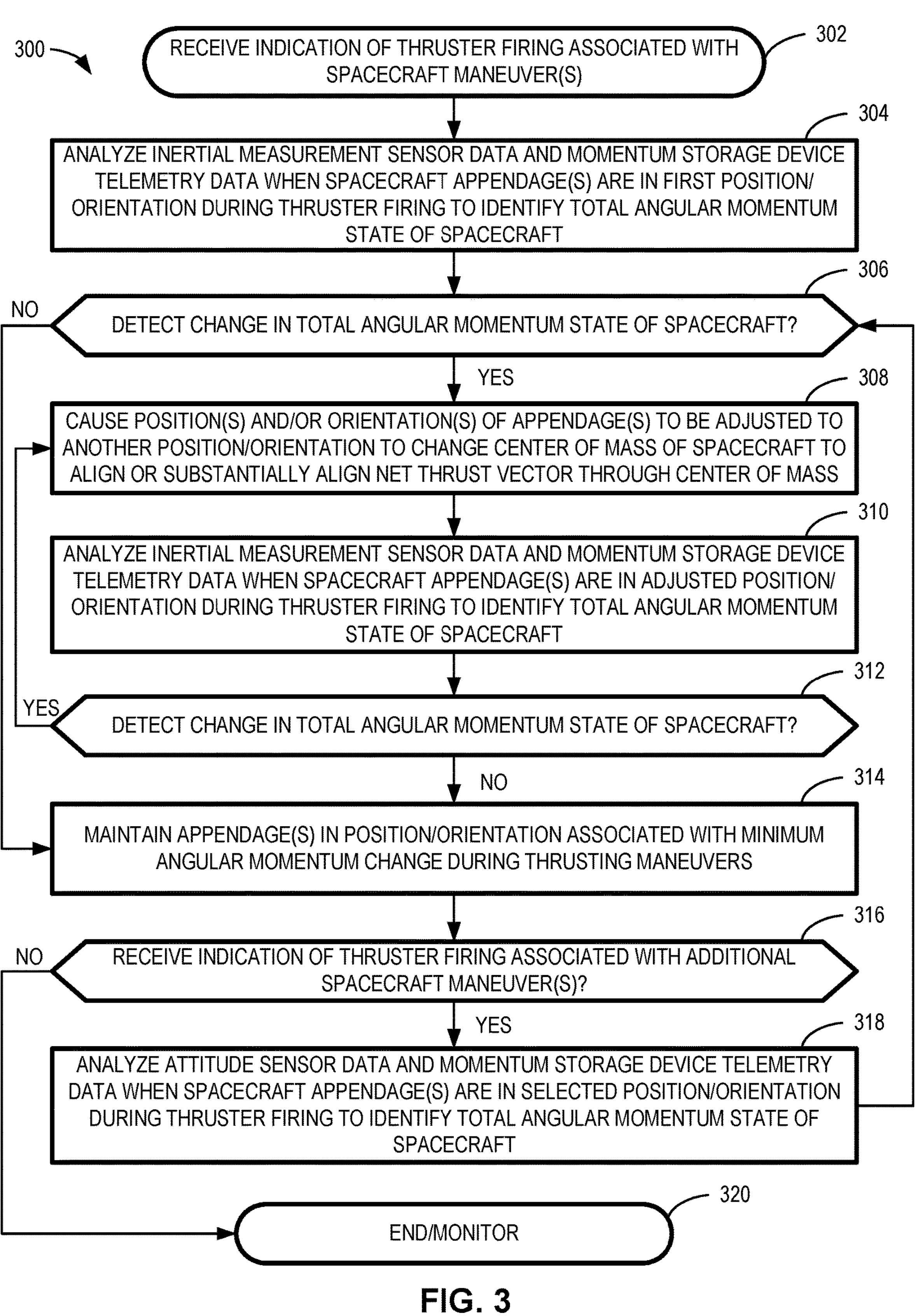
FIG. 3 is a flowchart representative of example machine-readable instructions and/or example operations that may be executed, instantiated, and/or performed by example programmable circuitry to implement the momentum control circuitry of FIG. 2.

A flowchart representative of example machine-readable instructions, which may be executed by programmable circuitry to implement and/or instantiate the momentum control circuitry 104 of FIG. 2 and/or representative of example operations which may be performed by programmable circuitry to implement and/or instantiate the momentum control circuitry 104 of FIG. 2, is shown in FIG. 3. The machine-readable instructions may be one or more executable programs or portion(s) of one or more executable programs for execution by programmable circuitry such as the programmable circuitry 412 shown in the example processor platform 400 discussed below in connection with FIG. 4 and/or may be one or more function(s) or portion(s) of functions to be performed by the example programmable circuitry (e.g., an FPGA) discussed below in connection with FIGS. 5 and/or 6. In some examples, the machine-readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer-readable and/or machine-readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer-readable and/or machine-readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine-readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer-readable storage medium may include one or more mediums. Further, although the example program is described with reference to the flowchart illustrated in FIG. 3, many other methods of implementing the example momentum control circuitry 104 may alternatively be used. For example, the order of execution of the blocks of the flowchart may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine-readable instructions described herein may be stored in one or more of a compressed format, an encrypted format, a fragmented format, a compiled format, an executable format, a packaged format, etc. Machine-readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine-readable instructions may be fragmented and stored on one or more storage devices, disks and/or computing devices (e.g., servers) located at the same or different locations of a network or collection of networks (e.g., in the cloud, in edge devices, etc.). The machine-readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine-readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine-readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine-readable instructions may need to be configured (e.g., settings stored, data input, network addresses recorded, etc.) before the machine-readable instructions and/or the corresponding program(s) can be executed in whole or in part. Thus, machine-readable, computer-readable and/or machine-readable media, as used herein, may include instructions and/or program(s) regardless of the particular format or state of the machine-readable instructions and/or program(s).

The machine-readable instructions described herein can be represented by any past, present, or future instruction language, scripting language, programming language, etc. For example, the machine-readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 3 may be implemented using executable instructions (e.g., computer-readable and/or machine-readable instructions) stored on one or more non-transitory computer-readable and/or machine-readable media. As used herein, the terms non-transitory computer-readable medium, non-transitory computer-readable storage medium, non-transitory machine-readable medium, and/or non-transitory machine-readable storage medium are expressly defined to include any type of computer-readable storage device and/or storage disk and to exclude propagating signals and to exclude transmission media. Examples of such non-transitory computer-readable medium, non-transitory computer-readable storage medium, non-transitory machine-readable medium, and/or non-transitory machine-readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer-readable storage device" and "non-transitory machine-readable storage device" are defined to include any physical (mechanical, magnetic and/or electrical) hardware to retain information for a time period, but to exclude propagating signals and to exclude transmission media. Examples of non-transitory computer-readable storage devices and/or non-transitory machine-readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer-readable instructions, machine-readable instructions, etc., and/or manufactured to execute computer-readable instructions, machine-readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a," "an," "first," "second," etc.) do not exclude a plurality. The term "a" or "an" object, as used herein, refers to one or more of that object. The terms "a" (or "an"), "one or more," and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 3 is a flowchart representative of example machine-readable instructions and/or example operations 300 that may be executed, instantiated, and/or performed by programmable circuitry to manage storage of momentum at a spacecraft in response to thrusting maneuvers. The example machine-readable instructions and/or the example operations 300 of FIG. 3 begin at block 302, at which the thruster status detection circuitry 202 of the example momentum control circuitry 104 of FIG. 2 receives an indication that the thrusters 112 of the spacecraft 102 are firing or expected to fire to facilitate performance of thrusting maneuvers at the spacecraft 102.

At block 304, the monitoring circuitry 204 of the example momentum control circuitry 104 of FIG. 2 analyzes the inertial measurement sensor data 210 corresponding to outputs of the inertial measurement sensor(s) 116 and the momentum storage device telemetry data 212 associated with the momentum storage device(s) 118 when the appendage(s) 108, 110 (e.g., solar array(s)) of the spacecraft 102 are in a first position or orientation during firing of the thruster(s) 112. The monitoring circuitry 204 determines a total angular momentum state of the spacecraft based on body angular rate from the inertial measurement sensor data 210 and the stored momentum determined from the momentum storage device telemetry data 212.

At block 306, the monitoring circuitry 204 determines, based on the momentum storage detection rule(s) 216, whether the total angular momentum state at the spacecraft 102 is changing due to the thrusting maneuvers (i.e., there is an increase or decrease in angular momentum stored at the spacecraft 102). For example, the monitoring circuitry 204 can detect a change in the total angular momentum state based on a change in the body rotation rate, a change in a rotational speed of a reaction wheel of the spacecraft 102, etc.

If the monitoring circuitry 204 detects a change in the total angular momentum at the spacecraft 102, then at block 308, the appendage control circuitry 206 causes position(s) and/or orientation(s) of the appendage(s) 108, 110 to be adjusted to other position(s) and/or orientation(s) relative to the spacecraft body 106 based on the appendage control rule(s) 218. In particular, the appendage control circuitry 206 causes the appendages(s) 108, 110 to move (e.g., rotate, tilt, tip) to change the center of mass 122 of the spacecraft 102 to align or substantially align the center of mass 122 and the net thrust vector 124 associated with the firing thruster(s) 112 (e.g., so that the net thrust vector 124 passes through or substantially passes through the center of mass 122).

At block 310, the monitoring circuitry 204 analyzes the inertial measurement sensor data 210 corresponding to outputs of the inertial measurement sensor(s) 116 and the momentum storage device telemetry data 212 associated with the momentum storage device(s) 118 when the appendage(s) 108, 110 of the spacecraft 102 are in the adjusted position or orientation during firing of the thruster(s) 112. The monitoring circuitry 204 analyzes the sensor data and/or the telemetry data to determine the total angular momentum state of the spacecraft 102 when the appendage(s) 108, 110 are in the adjusted position(s) and/or orientation(s).

If, at block 312, the monitoring circuitry 204 detects change in total angular momentum stored at the spacecraft 102 despite the position and/or orientation adjustment(s) to the appendage(s) 108, 110, then the monitoring circuitry 204 determines that the center of mass 122 should be further adjusted to facilitate alignment or substantial alignment with the net thrust vector 124. In such examples, control returns to block 308, at which the appendage control circuitry 206 outputs instructions to cause further adjustment(s) to the position(s) and/or orientation(s) of the appendage(s) 108, 110.

If the monitoring circuitry 204 does not detect a change in stored momentum at the spacecraft 102 during thrusting maneuvers while the appendage(s) 108, 110 are in the first position/orientation (block 306) and/or the adjusted position/orientation (block 312), then at block 314, the appendage control circuitry 206 causes the appendage(s) 108, 110 to be maintained in that position/orientation in view of minimum momentum changes (e.g., zero or substantially zero increase or decrease of stored momentum) at the spacecraft. For example, the appendage control circuitry 206 can refrain from outputting instructions to cause adjustments to the appendage(s) 108, 110 or can output instructions to cause the actuator(s) 111 to maintain the position(s) and/or orientation(s) of the appendage(s) 108, 110.

At block 316, the thruster status detection circuitry 202 can receive further indication of thruster firing in connection with, for example, performance of additional thrusting maneuvers. In such examples, the monitoring circuitry 204 determines the total angular momentum state of the spacecraft 102 based on the inertial measurement sensor data 210 and the momentum storage device telemetry data 212 (block 318) and control returns to block 306 for evaluation of changes in angular momentum storage at the spacecraft 102. The example instructions end when no further indications of firing of the thruster(s) 112 have been received (block 320).

Figure 4:
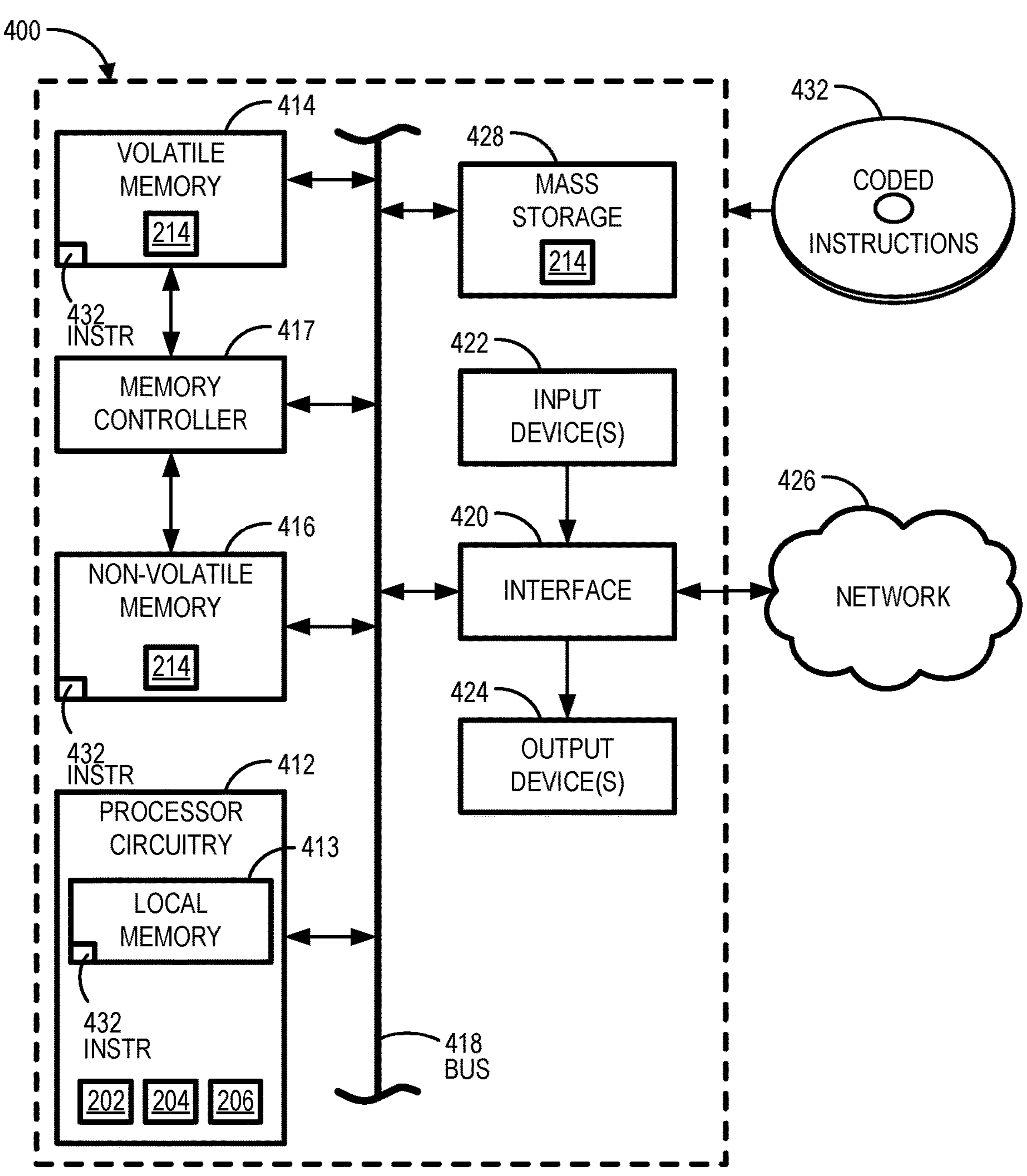
FIG. 4 is a block diagram of an example processing platform including programmable circuitry structured to execute, instantiate, and/or perform the example machine-readable instructions and/or perform the example operations of FIG. 3 to implement the momentum control circuitry of FIG. 2.

FIG. 4 is a block diagram of an example programmable circuitry platform 400 structured to execute and/or instantiate the example machine-readable instructions and/or the example operations of FIG. 3 to implement the momentum control circuitry 104 of FIG. 2. The programmable circuitry platform 400 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing and/or electronic device.

The programmable circuitry platform 400 of the illustrated example includes programmable circuitry 412. The programmable circuitry 412 of the illustrated example is hardware. For example, the programmable circuitry 412 can be implemented by one or more integrated circuits, logic circuits, FPGAs, microprocessors, CPUs, GPUs, DSPs, and/or microcontrollers from any desired family or manufacturer. The programmable circuitry 412 may be implemented by one or more semiconductor based (e.g., silicon based) devices. In this example, the programmable circuitry 412 implements the example thruster status detection circuitry 202, the example monitoring circuitry 204, and the example appendage control circuitry 206.

The programmable circuitry 412 of the illustrated example includes a local memory 413 (e.g., a cache, registers, etc.). The programmable circuitry 412 of the illustrated example is in communication with main memory 414, 416, which includes a volatile memory 414 and a non-volatile memory 416, by a bus 418. The volatile memory 414 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 416 may be implemented by flash memory and/or any other desired type of memory device. Access to the main memory 414, 416 of the illustrated example is controlled by a memory controller 417. In some examples, the memory controller 417 may be implemented by one or more integrated circuits, logic circuits, microcontrollers from any desired family or manufacturer, or any other type of circuitry to manage the flow of data going to and from the main memory 414, 416.

The programmable circuitry platform 400 of the illustrated example also includes interface circuitry 420. The interface circuitry 420 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 422 are connected to the interface circuitry 420. The input device(s) 422 permit(s) a user (e.g., a human user, a machine user, etc.) to enter data and/or commands into the programmable circuitry 412. The input device(s) 422 can be implemented by, for example, an audio sensor, a microphone, a camera (still or video), a keyboard, a button, a mouse, a touchscreen, a trackpad, a trackball, an isopoint device, and/or a voice recognition system.

One or more output devices 424 are also connected to the interface circuitry 420 of the illustrated example. The output device(s) 424 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 420 of the illustrated example, thus, typically includes a graphics driver card, a graphics driver chip, and/or graphics processor circuitry such as a GPU.

The interface circuitry 420 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 426. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 400 of the illustrated example also includes one or more mass storage discs or devices 428 to store firmware, software, and/or data. Examples of such mass storage discs or devices 428 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine-readable instructions 432, which may be implemented by the machine-readable instructions of FIG. 3, may be stored in the mass storage device 428, in the volatile memory 414, in the non-volatile memory 416, and/or on at least one non-transitory computer-readable storage medium such as a CD or DVD which may be removable.

Figure 5:
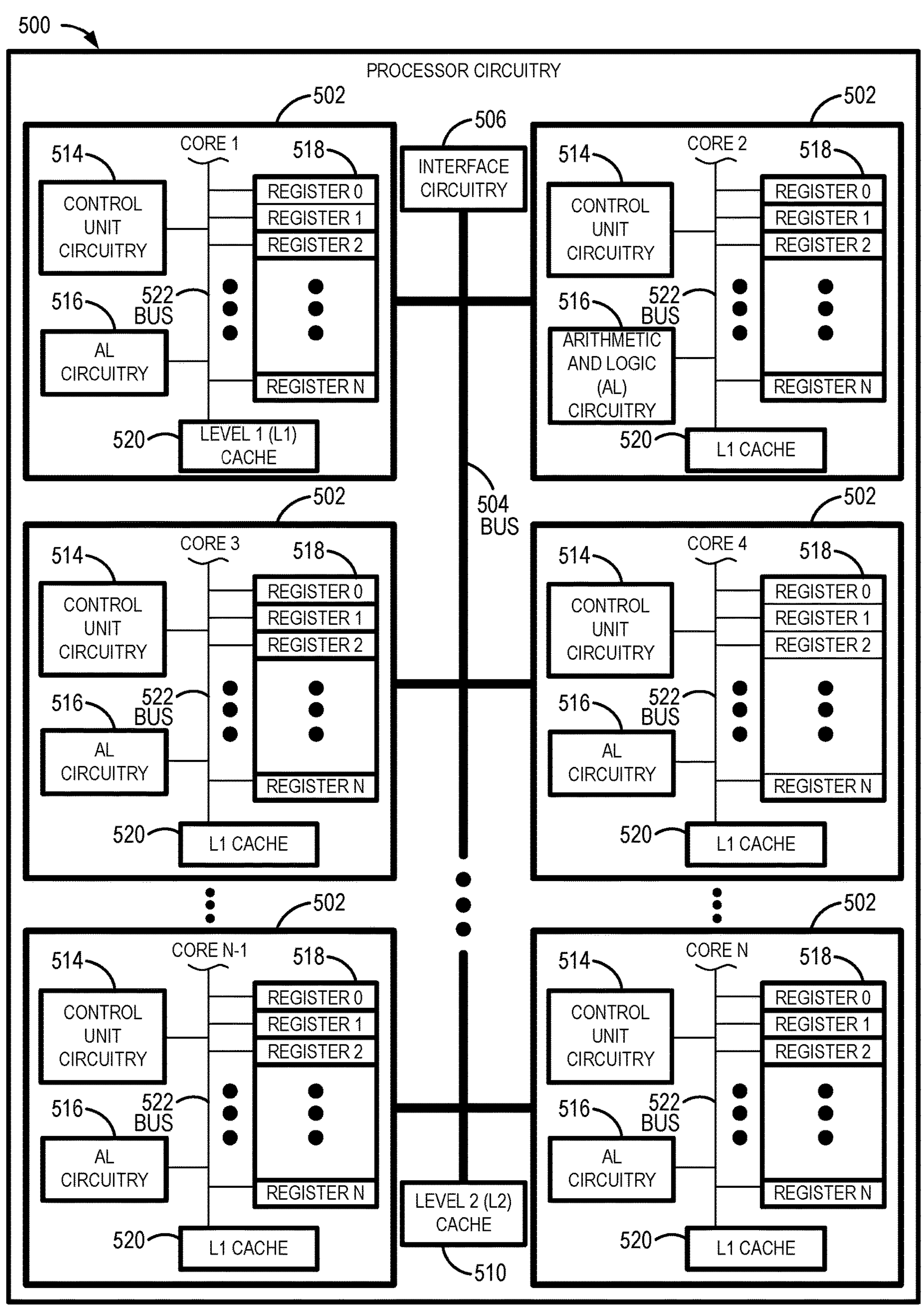
FIG. 5 is a block diagram of an example implementation of the programmable circuitry of FIG. 4.

FIG. 5 is a block diagram of an example implementation of the programmable circuitry 412 of FIG. 4. In this example, the programmable circuitry 412 of FIG. 4 is implemented by a microprocessor 500. For example, the microprocessor 500 may be a general-purpose microprocessor (e.g., general-purpose microprocessor circuitry). The microprocessor 500 executes some or all of the machine-readable instructions of the flowchart of FIG. 3 to effectively instantiate the circuitry of FIG. 2 as logic circuits to perform operations corresponding to those machine-readable instructions. In some such examples, the circuitry of FIG. 2 is instantiated by the hardware circuits of the microprocessor 500 in combination with the machine-readable instructions. For example, the microprocessor 500 may be implemented by multi-core hardware circuitry such as a CPU, a DSP, a GPU, an XPU, etc. Although it may include any number of example cores 502 (e.g., 1 core), the microprocessor 500 of this example is a multi-core semiconductor device including N cores. The cores 502 of the microprocessor 500 may operate independently or may cooperate to execute machine-readable instructions. For example, machine code corresponding to a firmware program, an embedded software program, or a software program may be executed by one of the cores 502 or may be executed by multiple ones of the cores 502 at the same or different times. In some examples, the machine code corresponding to the firmware program, the embedded software program, or the software program is split into threads and executed in parallel by two or more of the cores 502. The software program may correspond to a portion or all of the machine-readable instructions and/or operations represented by the flowchart of FIG. 3.

The cores 502 may communicate by a first example bus 504. In some examples, the first bus 504 may be implemented by a communication bus to effectuate communication associated with one(s) of the cores 502. For example, the first bus 504 may be implemented by at least one of an Inter-Integrated Circuit (I2C) bus, a Serial Peripheral Interface (SPI) bus, a PCI bus, or a PCIe bus. Additionally or alternatively, the first bus 504 may be implemented by any other type of computing or electrical bus. The cores 502 may obtain data, instructions, and/or signals from one or more external devices by example interface circuitry 506. The cores 502 may output data, instructions, and/or signals to the one or more external devices by the interface circuitry 506. Although the cores 502 of this example include example local memory 520 (e.g., Level 1 (L1) cache that may be split into an L1 data cache and an L1 instruction cache), the microprocessor 500 also includes example shared memory 510 that may be shared by the cores (e.g., Level 2 (L2 cache)) for high-speed access to data and/or instructions. Data and/or instructions may be transferred (e.g., shared) by writing to and/or reading from the shared memory 510. The local memory 520 of each of the cores 502 and the shared memory 510 may be part of a hierarchy of storage devices including multiple levels of cache memory and the main memory (e.g., the main memory 414, 416 of FIG. 4). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 502 may be referred to as a CPU, DSP, GPU, etc., or any other type of hardware circuitry. Each core 502 includes control unit circuitry 514, arithmetic and logic (AL) circuitry (sometimes referred to as an ALU) 516, a plurality of registers 518, the local memory 520, and a second example bus 522. Other structures may be present. For example, each core 502 may include vector unit circuitry, single instruction multiple data (SIMD) unit circuitry, load/store unit (LSU) circuitry, branch/jump unit circuitry, floating-point unit (FPU) circuitry, etc. The control unit circuitry 514 includes semiconductor-based circuits structured to control (e.g., coordinate) data movement within the corresponding core 502. The AL circuitry 516 includes semiconductor-based circuits structured to perform one or more mathematic and/or logic operations on the data within the corresponding core 502. The AL circuitry 516 of some examples performs integer based operations. In other examples, the AL circuitry 516 also performs floating-point operations. In yet other examples, the AL circuitry 516 may include first AL circuitry that performs integer-based operations and second AL circuitry that performs floating-point operations. In some examples, the AL circuitry 516 may be referred to as an Arithmetic Logic Unit (ALU).

The registers 518 are semiconductor-based structures to store data and/or instructions such as results of one or more of the operations performed by the AL circuitry 516 of the corresponding core 502. For example, the registers 518 may include vector register(s), SIMD register(s), general-purpose register(s), flag register(s), segment register(s), machine-specific register(s), instruction pointer register(s), control register(s), debug register(s), memory management register(s), machine check register(s), etc. The registers 518 may be arranged in a bank as shown in FIG. 5. Alternatively, the registers 518 may be organized in any other arrangement, format, or structure, such as by being distributed throughout the core 502 to shorten access time. The second bus 522 may be implemented by at least one of an I2C bus, a SPI bus, a PCI bus, or a PCIe bus.

Each core 502 and/or, more generally, the microprocessor 500 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 500 is a semiconductor device fabricated to include many transistors interconnected to implement the structures described above in one or more integrated circuits (ICs) contained in one or more packages.

The microprocessor 500 may include and/or cooperate with one or more accelerators (e.g., acceleration circuitry, hardware accelerators, etc.). In some examples, accelerators are implemented by logic circuitry to perform certain tasks more quickly and/or efficiently than can be done by a general-purpose processor. Examples of accelerators include ASICs and FPGAs such as those discussed herein. A GPU, DSP and/or other programmable device can also be an accelerator. Accelerators may be on-board the microprocessor 500, in the same chip package as the microprocessor 500 and/or in one or more separate packages from the microprocessor 500.

Figure 6:
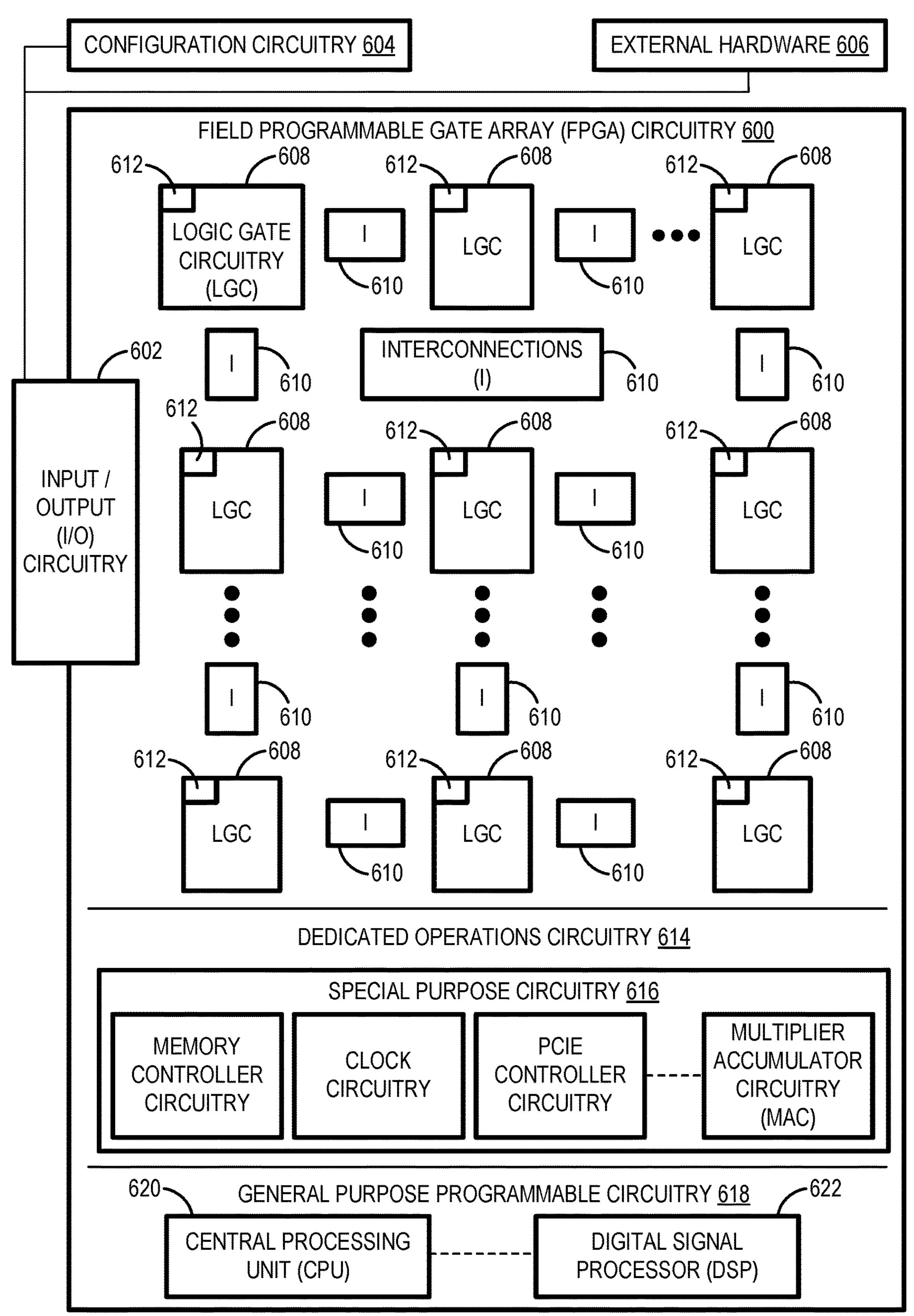
FIG. 6 is a block diagram of another example implementation of the programmable circuitry of FIG. 4.

FIG. 6 is a block diagram of another example implementation of the programmable circuitry 412 of FIG. 4. In this example, the programmable circuitry 412 is implemented by FPGA circuitry 600. For example, the FPGA circuitry 600 may be implemented by an FPGA. The FPGA circuitry 600 can be used, for example, to perform operations that could otherwise be performed by the example microprocessor 500 of FIG. 5 executing corresponding machine-readable instructions. However, once configured, the FPGA circuitry 600 instantiates the operations and/or functions corresponding to the machine-readable instructions in hardware and, thus, can often execute the operations/functions faster than they could be performed by a general-purpose microprocessor executing the corresponding software.

More specifically, in contrast to the microprocessor 500 of FIG. 5 described above (which is a general purpose device that may be programmed to execute some or all of the machine-readable instructions represented by the flowchart of FIG. 3 but whose interconnections and logic circuitry are fixed once fabricated), the FPGA circuitry 600 of the example of FIG. 6 includes interconnections and logic circuitry that may be configured, structured, programmed, and/or interconnected in different ways after fabrication to instantiate, for example, some or all of the operations/functions corresponding to the machine-readable instructions represented by the flowchart of FIG. 3. In particular, the FPGA circuitry 600 may be thought of as an array of logic gates, interconnections, and switches. The switches can be programmed to change how the logic gates are interconnected by the interconnections, effectively forming one or more dedicated logic circuits (unless and until the FPGA circuitry 600 is reprogrammed). The configured logic circuits enable the logic gates to cooperate in different ways to perform different operations on data received by input circuitry. Those operations may correspond to some or all of the instructions (e.g., the software and/or firmware) represented by the flowchart of FIG. 3. As such, the FPGA circuitry 600 may be configured and/or structured to effectively instantiate some or all of the operations/functions corresponding to the machine-readable instructions of the flowchart of FIG. 3 as dedicated logic circuits to perform the operations/functions corresponding to those software instructions in a dedicated manner analogous to an ASIC. Therefore, the FPGA circuitry 600 may perform the operations/functions corresponding to the some or all of the machine-readable instructions of FIG. 3 faster than the general-purpose microprocessor can execute the same.

In the example of FIG. 6, the FPGA circuitry 600 is configured and/or structured in response to being programmed (and/or reprogrammed one or more times) based on a binary file. In some examples, the binary file may be compiled and/or generated based on instructions in a hardware description language (HDL) such as Lucid, Very High Speed Integrated Circuits (VHSIC) Hardware Description Language (VHDL), or Verilog. For example, a user (e.g., a human user, a machine user, etc.) may write code or a program corresponding to one or more operations/functions in an HDL; the code/program may be translated into a low-level language as needed; and the code/program (e.g., the code/program in the low-level language) may be converted (e.g., by a compiler, a software application, etc.) into the binary file. In some examples, the FPGA circuitry 600 of FIG. 6 may access and/or load the binary file to cause the FPGA circuitry 600 of FIG. 6 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 600 of FIG. 6 to cause configuration and/or structuring of the FPGA circuitry 600 of FIG. 6, or portion(s) thereof.

In some examples, the binary file is compiled, generated, transformed, and/or otherwise output from a uniform software platform utilized to program FPGAs. For example, the uniform software platform may translate first instructions (e.g., code or a program) that correspond to one or more operations/functions in a high-level language (e.g., C, C++, Python, etc.) into second instructions that correspond to the one or more operations/functions in an HDL. In some such examples, the binary file is compiled, generated, and/or otherwise output from the uniform software platform based on the second instructions. In some examples, the FPGA circuitry 600 of FIG. 6 may access and/or load the binary file to cause the FPGA circuitry 600 of FIG. 6 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 600 of FIG. 6 to cause configuration and/or structuring of the FPGA circuitry 600 of FIG. 6, or portion(s) thereof.

The FPGA circuitry 600 of FIG. 6, includes example input/output (I/O) circuitry 602 to obtain and/or output data to/from example configuration circuitry 604 and/or external hardware 606. For example, the configuration circuitry 604 may be implemented by interface circuitry that may obtain a binary file, which may be implemented by a bit stream, data, and/or machine-readable instructions, to configure the FPGA circuitry 600, or portion(s) thereof. In some such examples, the configuration circuitry 604 may obtain the binary file from a user, a machine (e.g., hardware circuitry (e.g., programmable or dedicated circuitry) that may implement an Artificial Intelligence/Machine Learning (AI/ML) model to generate the binary file), etc., and/or any combination(s) thereof). In some examples, the external hardware 606 may be implemented by external hardware circuitry. For example, the external hardware 606 may be implemented by the microprocessor 500 of FIG. 5.

The FPGA circuitry 600 also includes an array of example logic gate circuitry 608, a plurality of example configurable interconnections 610, and example storage circuitry 612. The logic gate circuitry 608 and the configurable interconnections 610 are configurable to instantiate one or more operations/functions that may correspond to at least some of the machine-readable instructions of FIG. 3 and/or other desired operations. The logic gate circuitry 608 shown in FIG. 6 is fabricated in blocks or groups. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 608 to enable configuration of the electrical structures and/or the logic gates to form circuits to perform desired operations/functions. The logic gate circuitry 608 may include other electrical structures such as look-up tables (LUTs), registers (e.g., flip-flops or latches), multiplexers, etc.

The configurable interconnections 610 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 608 to program desired logic circuits.

The storage circuitry 612 of the illustrated example is structured to store result(s) of the one or more of the operations performed by corresponding logic gates. The storage circuitry 612 may be implemented by registers or the like. In the illustrated example, the storage circuitry 612 is distributed amongst the logic gate circuitry 608 to facilitate access and increase execution speed.

The example FPGA circuitry 600 of FIG. 6 also includes example dedicated operations circuitry 614. In this example, the dedicated operations circuitry 614 includes special purpose circuitry 616 that may be invoked to implement commonly used functions to avoid the need to program those functions in the field. Examples of such special purpose circuitry 616 include memory (e.g., DRAM) controller circuitry, PCIe controller circuitry, clock circuitry, transceiver circuitry, memory, and multiplier-accumulator circuitry.

Other types of special purpose circuitry may be present. In some examples, the FPGA circuitry 600 may also include example general purpose programmable circuitry 618 such as an example CPU 620 and/or an example DSP 622. Other general purpose programmable circuitry 618 may additionally or alternatively be present such as a GPU, an XPU, etc., that can be programmed to perform other operations.

Although FIGS. 5 and 6 illustrate two example implementations of the programmable circuitry 412 of FIG. 4, many other approaches are contemplated. For example, FPGA circuitry may include an on-board CPU, such as one or more of the example CPU 620 of FIG. 5. Therefore, the programmable circuitry 412 of FIG. 4 may additionally be implemented by combining at least the example microprocessor 500 of FIG. 5 and the example FPGA circuitry 600 of FIG. 6. In some such hybrid examples, one or more cores 502 of FIG. 5 may execute a first portion of the machine-readable instructions represented by the flowchart of FIG. 3 to perform first operation(s)/function(s), the FPGA circuitry 600 of FIG. 6 may be configured and/or structured to perform second operation(s)/function(s) corresponding to a second portion of the machine-readable instructions represented by the flowchart of FIG. 3, and/or an ASIC may be configured and/or structured to perform third operation(s)/function(s) corresponding to a third portion of the machine-readable instructions represented by the flowchart of FIG. 3.

It should be understood that some or all of the circuitry of FIG. 2 may, thus, be instantiated at the same or different times. For example, same and/or different portion(s) of the microprocessor 500 of FIG. 5 may be programmed to execute portion(s) of machine-readable instructions at the same and/or different times. In some examples, same and/or different portion(s) of the FPGA circuitry 600 of FIG. 6 may be configured and/or structured to perform operations/functions corresponding to portion(s) of machine-readable instructions at the same and/or different times.

In some examples, some or all of the circuitry of FIG. 2 may be instantiated, for example, in one or more threads executing concurrently and/or in series. For example, the microprocessor 500 of FIG. 5 may execute machine-readable instructions in one or more threads executing concurrently and/or in series. In some examples, the FPGA circuitry 600 of FIG. 6 may be configured and/or structured to carry out operations/functions concurrently and/or in series. Moreover, in some examples, some or all of the circuitry of FIG. 2 may be implemented within one or more virtual machines and/or containers executing on the microprocessor 500 of FIG. 5.

In some examples, the programmable circuitry 412 of FIG. 4 may be in one or more packages. For example, the microprocessor 500 of FIG. 5 and/or the FPGA circuitry 600 of FIG. 6 may be in one or more packages. In some examples, an XPU may be implemented by the programmable circuitry 412 of FIG. 4, which may be in one or more packages. For example, the XPU may include a CPU (e.g., the microprocessor 500 of FIG. 5, the CPU 620 of FIG. 6, etc.) in one package, a DSP (e.g., the DSP 622 of FIG. 6) in another package, a GPU in yet another package, and an FPGA (e.g., the FPGA circuitry 600 of FIG. 6) in still yet another package.

Figure 7:
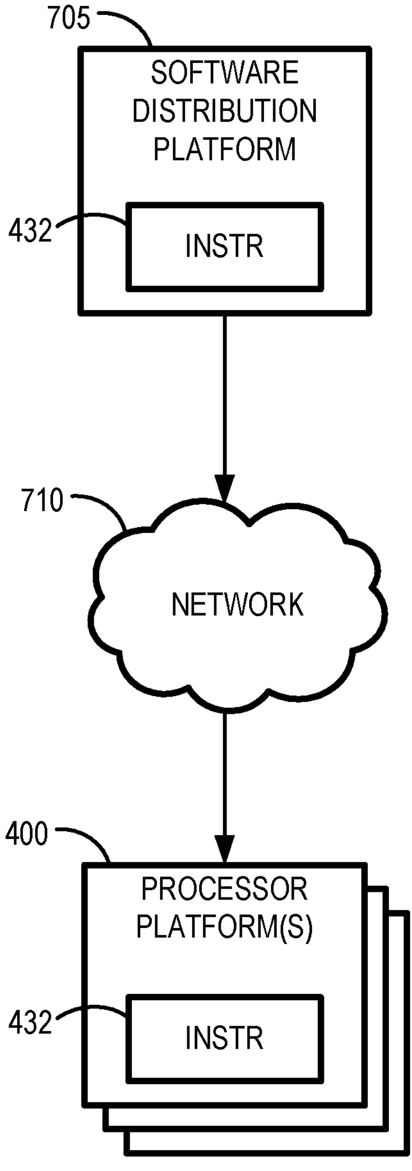
FIG. 7 is a block diagram of an example software/firmware/instructions distribution platform (e.g., one or more servers) to distribute software, instructions, and/or firmware (e.g., corresponding to the example machine-readable instructions of FIG. 3) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 705 to distribute software such as the example machine-readable instructions 432 of FIG. 4 to other hardware devices (e.g., hardware devices owned and/or operated by third parties from the owner and/or operator of the software distribution platform) is illustrated in FIG. 7. The example software distribution platform 705 may be implemented by any computer server, data facility, cloud service, etc., capable of storing and transmitting software to other computing devices. The third parties may be customers of the entity owning and/or operating the software distribution platform 705. For example, the entity that owns and/or operates the software distribution platform 705 may be a developer, a seller, and/or a licensor of software such as the example machine-readable instructions 432 of FIG. 4. The third parties may be consumers, users, retailers, OEMs, etc., who purchase and/or license the software for use and/or re-sale and/or sub-licensing. In the illustrated example, the software distribution platform 705 includes one or more servers and one or more storage devices. The storage devices store the machine-readable instructions 432, which may correspond to the example machine-readable instructions of FIG. 3, as described above. The one or more servers of the example software distribution platform 705 are in communication with an example network 710, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine-readable instructions 432 from the software distribution platform 705. For example, the software, which may correspond to the example machine-readable instructions of FIG. 3, may be downloaded to the example programmable circuitry platform 400, which is to execute the machine-readable instructions 432 to implement the momentum control circuitry 104. In some examples, one or more servers of the software distribution platform 705 periodically offer, transmit, and/or force updates to the software (e.g., the example machine-readable instructions 432 of FIG. 4) to ensure improvements, patches, updates, etc., are distributed and applied to the software at the end user devices. Although referred to as software above, the distributed "software" could alternatively be firmware.

From the foregoing, it will be appreciated that example systems, apparatus, articles of manufacture, and methods have been disclosed that provide for momentum control at a spacecraft by adjusting a center of mass of the spacecraft in connection with, for example, performance of thrusting maneuvers. Examples disclosed herein cause position(s) and/or orientation(s) of appendage(s) of the spacecraft, such as solar arrays, to change to dynamically change the center of mass of the spacecraft. As a result of the adjustments to the spacecraft center of mass, examples disclosed herein facilitate alignment or substantial alignment between the center of mass and a net thrust vector resulting from firing of spacecraft thrusters during the maneuvers. The alignment between the center of mass and the net thrust vector prevents or substantially reduces changes in stored momentum at the spacecraft during the maneuvers. Thus, examples disclosed herein efficiently manage stored momentum at the spacecraft during thrusting maneuvers via adjustments to the spacecraft center of mass.

Example systems, apparatus, and method for momentum management for a spacecraft are disclosed. Further examples and combinations thereof include the following:

Example 1 includes a spacecraft including a body; an appendage moveably coupled to the body; a thruster carried by the body; machine-readable instructions; and processor circuitry to execute the machine-readable instructions to detect a change in angular momentum at the spacecraft during firing of the thruster; and, in response to the detection, cause the appendage to move relative to the body to adjust a center of mass of the spacecraft relative to a net thrust vector associated with the thruster.

Example 2 includes the spacecraft of example 1, further including an inertial measurement sensor to generate outputs indicative of a rotation rate of the body; and a momentum storage device carried by the body, the processor circuitry to determine the angular momentum based on the rotation rate and stored momentum at the momentum storage device.

Example 3 includes the spacecraft of examples 1 or 2, wherein the processor circuitry is to detect a change in the angular momentum at the spacecraft after the movement of the appendage; and cause the appendage to move relative to the body to further adjust the center of mass.

Example 4 includes the spacecraft of any of examples 1-3, wherein the processor circuitry is to cause the appendage to move to adjust one or more of a position or an orientation of the appendage relative to the body.

Example 5 includes the spacecraft of any of examples 1-4, wherein the firing of the thruster is at a first time and the processor circuitry is to cause the appendage to move to a first position relative to the body, the processor circuitry to receive an indication of firing of the thruster at a second time, the second time after the first time; and cause the appendage to move to the first position in response to the indication of the firing of the thruster at the second time.

Example 6 includes the spacecraft of any of examples 1-5, wherein the appendage is a solar array.

Example 7 includes the spacecraft of any of examples 1-6, wherein the thruster is an electric propulsion thruster.

Example 8 includes the spacecraft of any of examples 1-7, wherein the processor circuitry is to cause the appendage to move by causing the appendage to one or more of rotate or tilt relative to the body.

Example 9 includes an apparatus including memory; machine-readable instructions; and processor circuitry to execute the machine-readable instructions to determine a first angular momentum state of a satellite at a first time; determine a second angular momentum state of the satellite at a second time, the second time associated with performance of a thrusting maneuver by the satellite; detect a change between the first angular momentum state and the second angular momentum state of the satellite; and, in response to the detection of the change, cause an appendage of the satellite to move from a first position to a second position relative to a body of the satellite to change a center of mass of the satellite.

Example 10 includes the apparatus of example 9, wherein the processor circuitry is to identify the first angular momentum state based on (a) outputs of an inertial measurement sensor of the satellite and (b) telemetry data associated with a momentum storage device of the satellite.

Example 11 includes the apparatus of examples 9 or 10, wherein the telemetry data is indicative of a rotational speed of the momentum storage device.

Example 12 includes the apparatus of any of examples 9-11, wherein the outputs of the inertial measurement sensor are indicative of a rotation rate of the body of the satellite.

Example 13 includes the apparatus of any of examples 9-12, wherein the processor circuitry is to determine a third angular momentum state of the satellite at a third time, the third time after the first time and the second time; detect a change between the second angular momentum state and the third angular momentum state; and cause the appendage to move from the second position to a third position in response to the detection of the change between the second angular momentum state and the third angular momentum state.

Example 14 includes the apparatus of any of examples 9-13, wherein the third time is associated with the performance of the thrusting maneuver by the satellite.

Example 15 includes the apparatus of any of examples 9-14, wherein the thrusting maneuver is a first thrusting maneuver and the processor circuitry is to detect performance of a second thrusting maneuver after the performance of the first thrusting maneuver; and cause the appendage to be in the second position responsive to performance of the second thrusting maneuver.

Example 16 includes a non-transitory machine-readable storage medium comprising instructions to cause programmable circuitry to at least identify, based on (a) sensor data corresponding to outputs of an inertial measurement sensor of a spacecraft and (b) telemetry data associated with a momentum storage device of the spacecraft, a misalignment between a center of mass of the spacecraft and a net thrust vector during firing of a thruster of the spacecraft; and, responsive to the identification, adjust the center of mass of the spacecraft.

Example 17 includes the non-transitory machine-readable storage medium of example 16, wherein the instructions cause the programmable circuitry to adjust the center of mass by causing an actuator to move an appendage of the spacecraft.

Example 18 includes the non-transitory machine-readable storage medium of examples 16 or 17, wherein the firing of the thruster is associated with a first thrusting maneuver by the spacecraft and the processor circuitry is to cause the actuator to move to the appendage to one or more of a first position or a first orientation.

Example 19 includes the non-transitory machine-readable storage medium of any of examples 16-18, wherein the instructions when executed, cause the programmable circuitry to detect a second thrusting maneuver to be performed by the spacecraft after the first thrusting maneuver; and cause the appendage to be in the first position or the first orientation during performance of the second thrusting maneuver.

Example 20 includes the non-transitory machine-readable storage medium of any of examples 16-19, wherein the sensor data and the telemetry data are collected a first time, the first time before the adjustment of the center of mass, and the instructions cause the programmable circuitry to detect, based on one or more of the sensor data or the telemetry data collected at a second time, the second time after the adjustment of the center of mass, a change in angular momentum at the spacecraft; and further adjust the center of mass of the spacecraft.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. A spacecraft comprising:

a body;

an appendage movably coupled to the body;

a thruster carried by the body, the thruster being one of a plurality of thrusters carried by the body, the appendage separately coupled to the body relative to the coupling of each of the plurality of thrusters to the body;

machine-readable instructions; and at least one programmable circuit to execute the machine-readable instructions to:

detect a change in angular momentum at the spacecraft during firing of the thruster; and responsive to the detection, cause the appendage to move relative to the body to adjust a center of mass of the spacecraft relative to a net thrust vector associated with the thruster.

2. The spacecraft of claim 1, further including:

an inertial measurement sensor to generate outputs indicative of a rotation rate of the body; and a momentum storage device carried by the body, one or more of the at least one programmable circuit to determine the angular momentum based on the rotation rate and stored momentum at the momentum storage device.

3. The spacecraft of claim 1, wherein one or more of the at least one programmable circuit is to:

detect a change in the angular momentum at the spacecraft after the movement of the appendage; and cause the appendage to move relative to the body to further adjust the center of mass.

4. The spacecraft of claim 1, wherein one or more of the at least one programmable circuit is to cause the appendage to move to adjust one or more of a position or an orientation of the appendage relative to the body.

5. The spacecraft of claim 1, wherein the firing of the thruster is at a first time, the appendage is to move to a first position relative to the body responsive to the detection of the change in the angular momentum, and one or more of the at least one programmable circuit to:

receive an indication of firing of the thruster at a second time, the second time after the first time; and cause the appendage to move from the first position to a second position relative to the body responsive to the indication of the firing of the thruster at the second time.

6. The spacecraft of claim 1, wherein the appendage is a solar array.

7. The spacecraft of claim 1, wherein the thruster is an electric propulsion thruster.

8. The spacecraft of claim 1, wherein one or more of the at least one programmable circuit is to cause the appendage to move by causing the appendage to one or more of rotate or tilt relative to the body.

9. The spacecraft of claim 1, wherein the appendage is a radiator panel or an antenna.

10. An apparatus comprising:

memory;

machine-readable instructions; and at least one programmable circuit to execute the machine-readable instructions to:

determine a first angular momentum state of a satellite at a first time;

determine a second angular momentum state of the satellite at a second time, the second time associated with performance of a thrusting maneuver by the satellite, the satellite including a plurality of thrusters;

detect a change between the first angular momentum state and the second angular momentum state of the satellite; and responsive to the detection of the change, cause an appendage of the satellite to move from a first position to a second position relative to a body of the satellite to change a center of mass of the satellite, the appendage coupled to a different portion of the satellite than each of the plurality of thrusters.

11. The apparatus of claim 10, wherein one or more of the at least one programmable circuit is to identify the first angular momentum state based on (a) outputs of an inertial measurement sensor of the satellite and (b) telemetry data associated with a momentum storage device of the satellite.

12. The apparatus of claim 11, wherein the telemetry data is indicative of a rotational speed of the momentum storage device.

13. The apparatus of claim 11, wherein the outputs of the inertial measurement sensor are indicative of a rotation rate of the body of the satellite.

14. The apparatus of claim 10, wherein one or more of the at least one programmable circuit is to:

determine a third angular momentum state of the satellite at a third time, the third time after the first time and the second time;

detect a change between the second angular momentum state and the third angular momentum state; and cause the appendage to move from the second position to a third position responsive to the detection of the change between the second angular momentum state and the third angular momentum state.

15. The apparatus of claim 14, wherein the third time is associated with the performance of the thrusting maneuver by the satellite.

16. The apparatus of claim 10, wherein the thrusting maneuver is a first thrusting maneuver and one or more of the at least one programmable circuit is to:

detect performance of a second thrusting maneuver after the performance of the first thrusting maneuver; and cause the appendage to be in the second position responsive to performance of the second thrusting maneuver.

17. A non-transitory machine-readable storage medium comprising machine-readable instructions to cause at least one programmable circuit to at least:

identify, based on (a) sensor data corresponding to outputs of an inertial measurement sensor of a spacecraft and (b) telemetry data associated with a momentum storage device of the spacecraft, a misalignment between a center of mass of the spacecraft and a net thrust vector during firing of a thruster of the spacecraft, the thruster being one of a plurality of thrusters of the spacecraft; and responsive to the identification, cause an actuator to move an appendage of the spacecraft to adjust the center of mass of the spacecraft, the appendage independently coupled to the spacecraft relative to the coupling of respective ones of the plurality of thrusters to the spacecraft.

18. The non-transitory machine-readable storage medium of claim 17, wherein the firing of the thruster is associated with a first thrusting maneuver by the spacecraft and the machine-readable instructions are to cause one or more of the at least one programmable circuit to cause the actuator to move to the appendage to one or more of a first position or a first orientation.

19. The non-transitory machine-readable storage medium of claim 18, wherein the machine-readable instructions are to cause one or more of the at least one programmable circuit to:

detect a second thrusting maneuver to be performed by the spacecraft after the first thrusting maneuver; and cause the appendage to be in the first position or the first orientation during performance of the second thrusting maneuver.

20. The non-transitory machine-readable storage medium of claim 17, wherein the sensor data and the telemetry data are collected a first time, the first time before the adjustment of the center of mass, and the machine-readable instructions are to cause one or more of the at least one programmable circuit to:

detect, based on the sensor data and the telemetry data collected at a second time, the second time after the adjustment of the center of mass, a change in angular momentum at the spacecraft; and further adjust the center of mass of the spacecraft.

* * * * *